July 30, 1935. R. A. HEISING 2,009,693
DISTANCE CONTROLLED INDICATOR SYSTEM
Filed Feb. 16, 1924   2 Sheets-Sheet 1
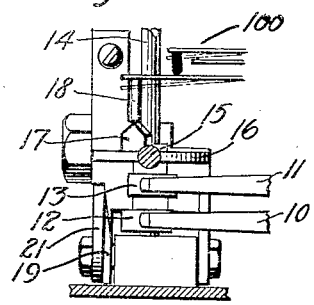
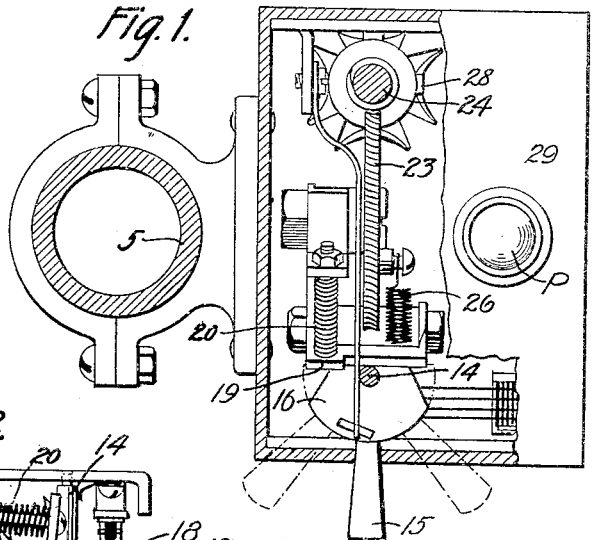
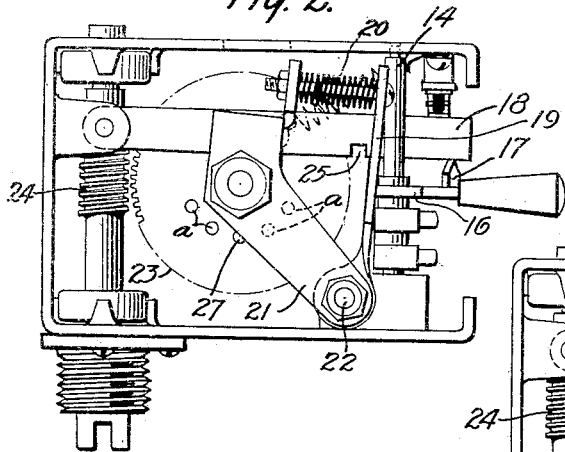
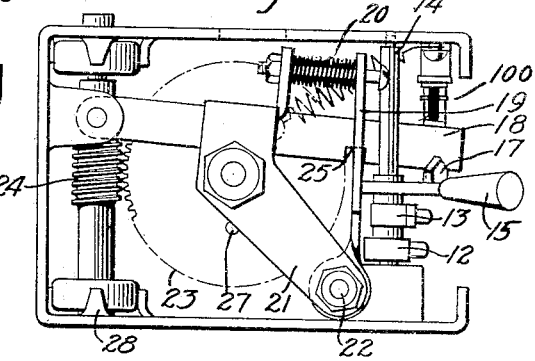
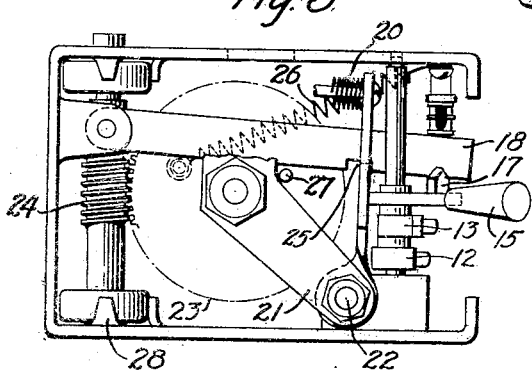
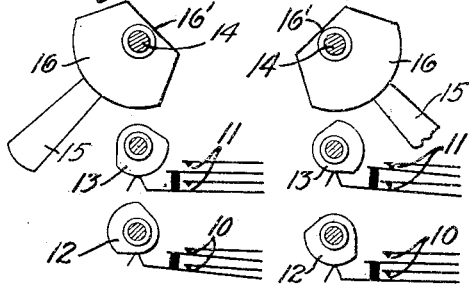
Inventor:
Raymond A. Heising.

July 30, 1935.    R. A. HEISING    2,009,693
DISTANCE CONTROLLED INDICATOR SYSTEM
Filed Feb. 16, 1924    2 Sheets-Sheet 2
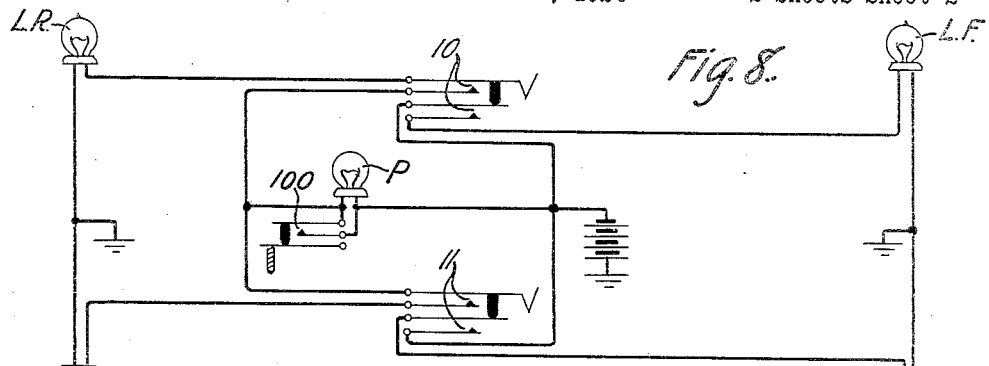
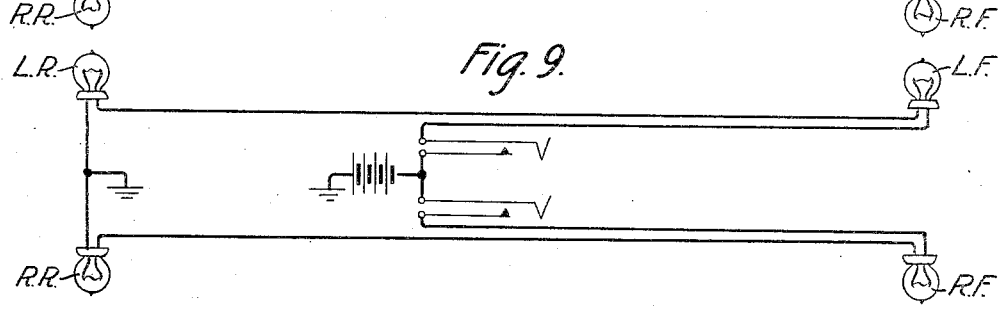
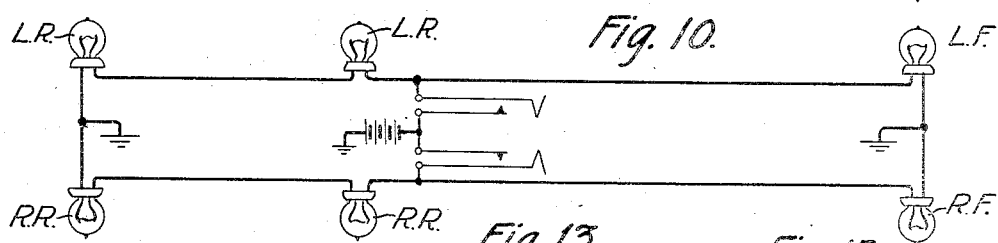
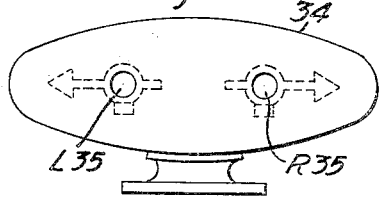
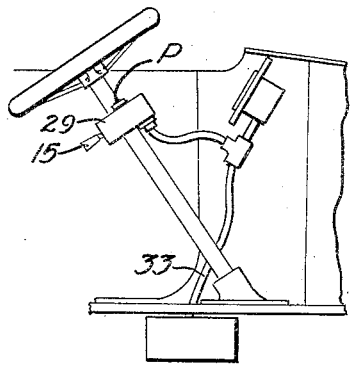
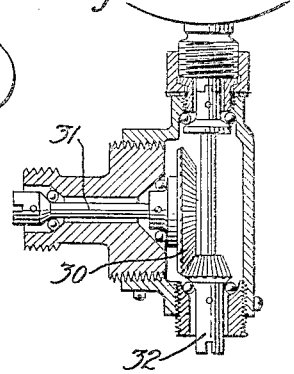
Inventor:
Raymond A. Heising.

Patented July 30, 1935

2,009,693

UNITED STATES PATENT OFFICE 2,009,693

DISTANCE CONTROLLED INDICATOR SYSTEM

Raymond A. Heising, Millburn, N. J., assignor of one-half to James P. Kendall, Cranford, N. J.

Application February 16, 1934, Serial No. 693,158

3 Claims. (Cl. 177—339)

This invention relates to direction indicators for moving vehicles.

An object of the invention is to provide for the giving of an indication by the operator of a moving vehicle and subsequent withdrawal of the indication after the vehicle has traveled a predetermined distance without further attention on the part of the operator. A corollary object is to provide for the cancellation of the indication by the operator at any time prior to the expiration of the predetermined time.

The invention is exemplified in one form thereof by an arrangement adapted to give simultaneous front and rear indications on an automobile of the direction in which the driver is about to turn. A movable element, on the steering post for example, may be moved to the right or left to indicate the driver's intention to turn in one of those directions, respectively. A signal holding mechanism then functions to lock and hold the indication for a predetermined distance of travel, for example 50, 100, or 150 feet, after which the movable element is restored to normal and the signal canceled without further attention on the part of the operator who thus has his mind, hands, and feet free to attend to his driving controls except for the small instant of time necessary to operate the movable indicator control element.

Other objects are to provide for rear distance-of-travel-controlled automobile signal lights with a flashing pilot light before the operator to give a positive indication at the beginning and end of each signal given in the rear or during the continuance thereof, to provide positive and effective distance controlled rear signal indications, and to provide simple, compact, and convenient apparatus for carrying the foregoing and other objects into effect.

The invention is further illustrated in connection with the accompanying drawings wherein Fig. 1 is a top plan view partly broken away to show the main elements of a control device for direction indicating lights in unoperated position.

Fig. 2 is a side view of the operating parts in unoperated position.

Fig. 3 is a side view of the same parts in the position assumed just after the giving of an indication.

Fig. 4 is a similar view of the same parts in the position assumed just after the giving of an indication but under the special condition wherein the restoring ratchet teeth do not at once mesh.

Fig. 5 illustrates the manner in which the pilot light contact is operated.

Figs. 6 and 7 show diagrammatically the positions of main contacts under the conditions of left-hand and right-hand turn indications, respectively.

Fig. 8 is a circuit diagram of front, rear, and pilot lights, and Figs. 9 and 10 are modified circuit diagrams.

Fig. 11 shows the general arrangement of attachment of the device and its drive by the speedometer shaft.

Fig. 12 shows the specific drive mechanism as attached to the speedometer shaft.

Fig. 13 is either a front or a rear view of a form of front light housing whereby the front lights serve as pilot lights in such a circuit as that of Fig. 9, for example.

By referring preliminarily to Fig. 8, the general plan of operation of the system may be comprehended. The driver wishing to turn to the right operates mechanism to close circuits through a front right light RF and a rear right light RR. After a predetermined distance of travel, the lights are extinguished automatically. For a left turn the left front and left rear lights LF and LR lights are lighted. In either case, a pilot light P flashes at the beginning and end of each signaling indication. As the pilot light cannot flash unless the rear lights are operating properly, the driver is assured of this fact which is much to his advantage in case of another driver negligently colliding with him from the rear or from the side as he is about to turn. When the rear lights are not operating properly, the driver is at once apprised of that fact.

The main contacts 10 and 11 (Figs. 6 and 7) are controlled by cams 12 and 13 mounted on shaft 14 to which is attached handle 15. When handle 15 is turned to the left, the left contacts 10 are closed. When handle 15 is turned to the right, the right contacts 11 are closed. The mechanism for restoring the contacts 10, 11; the handle 15; and the cams 12, 13 to then unoperated position, is shown in Figs. 1, 2, 3, and 4.

Figs. 1, 2, 3, and 4 will now be described in detail. The control apparatus is mounted in a casing 29 mounted upon the steering post S. The operating handle 15 is rigidly attached to shaft (spindle or pintle) 14 as are cams 12, 13 and 16. The handle 15 when turned to the right closes contacts 11, and when to the left closes contacts 10. In traveling to either its left or right position, the cam-shaped lug on handle 15, 17 passes from under the pivoted latch bar 18 and allows the latch bar 18 to fall down and the contact 100 to be closed as soon as the pivoted arm 19 moves backwardly to engage the notch 25 but the contact 100 is not closed until after the principal contacts 10 or 11 have closed and is opened again when the handle 15 is restored before the contacts 10 or 11 have opened.

When handle 15 is turned to the right, the right-hand part of cam 16 engages pivoted arm 19 and compresses spring 20. Spring 20 tends to move the elements 19 forward and 21 backward about their common axis 22. The elements 19 and 21 are pivoted upon the axis 22 but are free to move independently. When they approach each other they compress the spring 20. Gear wheel 23 is journaled upon element 21 and is advanced so that its teeth engage the teeth of the driving worm 24 (Fig. 3) or merely contact therewith (Fig. 4). In the latter case, the teeth engage properly after the worm 24 has made a half of a revolution, more or less, because the arm 19 has become engaged in the notch 25 of the latch arm 18, and consequently the spring 20 remains compressed, as shown in Fig. 4, and continues to urge the member 21 backward.

As soon as the teeth of the gear 23 and the worm 24 have become engaged, the worm, which is driven at a rate proportional to the speed of the vehicle, begins to turn the gear 23 against the tension of the spring 26. It is immaterial in which direction the gear 23 is turned because in either direction the pin 27 will, after a certain distance of travel which will be about the same in either case, engage the latch arm 18 and move it in an upward direction which will release the arm 19 from the notch 25. The spring 26 will then pull the gear 23 from engagement with the worm gear 24. The element 19 will push the handle 15 back to its central position by pushing upon the cam 16. All the signal lights and the pilot lights are then extinguished. The entire cycle of operations may then be repeated by pushing the handle 15 either to the left or to the right.

The worm gear 24 is mounted in ball bearings held in place by lugs 28 struck up from the casing 29 and may be driven by a bevel gear 30 (Fig. 12) and shaft 31 connected to another gear in the usual speedometer drive shaft 32 which is housed in the flexible conduit 33, although any other method of driving the gear 24 by and in proportion to the movement of the vehicle will suffice. It is contemplated that the gear 24 may be driven by being connected to any part of the vehicle which will cause it to be driven in accordance with the speed thereof or approximately so.

By referring to the circuit of Fig. 8, the manner of giving an indication will be outlined. When handle 15 is moved, to the right for example, the contacts 11 will be closed. This will cause the right front and right rear signal lights RF and RR, respectively, to be energized and lighted. For a brief instant, the contact 100 will remain open after the contacts 11 have closed and the low voltage or low current pilot lamp P will flash before the operator, thereby indicating to him that the rear signal light is receiving current. Immediately thereafter, the contact 100 is closed and the lamp P is short circuited, thereby placing the full voltage across the lamp RR. After traveling the distance for which the device is set to operate, the pin 27 will strike the pivoted latch bar 18 and the cam 16 will restore the handle 15 to its central position. Just before contacts 11 are opened, the contact 100 is opened and the pilot light P flashes again after which the contacts 11 open and the lamps are all out. A short circuit as well as an open circuit between the lamp P and the lamp RR will be indicated by inoperative condition of the pilot light P because, in the latter case, the lamp P will be burned out by the excessive voltage and no flash of the pilot light P will result in either case.

For a left-hand signal, the handle 15 will be turned to the left and a corresponding cycle of operations will take place with the left-hand indicator lamps LF and SR.

In Fig. 9 is shown a modified form of circuit in which the pilot lamp is omitted and lamps LR and LF are placed in series on one side and RR and RF on the other side. A single contact 10 and a single contact 11 are all that are necessary. By placing the front lamps in a casing 34 (Fig. 13) mounted on the front of the vehicle in view of the driver, they will not only serve to indicate to traffic officers or others the direction about to be taken but will also serve as pilot lamps for the rear lights by placing in the rear of the housing 34 openings or transparent glass portions L35 and R35 respectively just back of the corresponding lights LF and RF. It is understood, of course, that the front of the casing 34 will contain similar or other suitably designed transparent windows through which signals or front indications are given as to the direction about to be taken. In other words the view in Fig. 13 may represent the front as well as the rear appearance of the casing containing the front signal lamps LF and RF.

In Fig. 10 is a circuit arrangement in which two pilot lights, one right and one left are used. These are in series with their respective rear lights and the combination thus formed is in parallel with the front signal lights. For a right-hand indication, the pilot lamp RP glows before the driver and for a left-hand indication, the pilot lamp LP glows thus indicating that the rear signals are operating properly. The pilot lights RP and LP may in this case be placed in a small casing of the form of that in Fig. 13 placed in any suitable position before the driver.

In operation, the operator is not only able to give an indication of a proposed turn at any time by a single simple motion of the hand or finger but is able to cancel the indication at any time by moving the handle 15 to the normal middle position where it is held by the spring 20 which presses element 19 against the flattened rear surface 16' of cam 16. Lug 17 rises lever 18, allowing spring 26 to restore the mechanism. When this is done, the apparatus is at once conditioned to repeat the indication or to give the opposite indication. When not canceled by the driver, the indication is always maintained until the required distance of travel has supervened.

By providing a series of screw threaded holes $a$, $a$ (Fig. 2) the apparatus may be adjusted for different distances of travel by placing pins similar to pin 27 in the proper hole. If the device is to work at the same distances for either direction of rotation of shaft 24, two pins should be placed at equal angular distances from the bar 18. However, as the direction of rotation of shaft 24 can readily be observed, and as it will ordinarily not be desired to use the device for backward travel of the vehicle, a single pin properly located will usually be sufficient.

The scope of the invention is not limited by the specific devices described above but only by the scope of the appended claims.

The novel features, methods, and combinations of parts believed to be inherent in the invention are defined in the appended claims. I claim:—

1. A system for setting direction indicating lights including signal lights, a rotating gear, a gear driven thereby, means including an operating handle for engaging said gears, means controlled by the operation of said means for causing said signal lights to be energized, means including a mechanical latch for retaining said gears in contact, means whereby said gear releases said latch, and means operated by the release of said latch to deenergize said lights.

2. In combination, a signal light, contacts in circuit therewith, means including an operating handle for controlling said contacts, a movable member, a gear mounted in said movable member, means including a cam movable with said handle whereby said handle upon moving moves said member and engages said gear with another gear, locking means for holding said gear in engagement, means actuated by rotation of said other gear to release said locking means, and means under tension for restoring said movably mounted gear and said handle.

3. In combination, a vehicle, right- and left-hand signal lights therefor, means for selectively lighting one or the other thereof, an element movable when not locked to extinguish said selected light, means for moving said element to locking position upon energization of either of said lights, locking means for locking said element from moving to extinguish either of said lights when selected and lighted, and means continually operating by and proportionally to the operating speed of said vehicle and effectively coupled to other mechanism upon the lighting of one of said lights to release said element for motion to extinguish the selected light by disengaging said locking means by forcible mechanical operation thereof.

RAYMOND. A. HEISING.